United States Patent
Hertz (10) Patent No.: US 6,728,742 B1
(45) Date of Patent: Apr. 27, 2004

(54) DATA STORAGE PATTERNS FOR FAST FOURIER TRANSFORMS

(76) Inventor: David Hertz, 29 KK"L ST., Kiryat Motzkin 26325 (IL)

( * ) Notice: Subject to any disclaimer, the term of this patent is extended or adjusted under 35 U.S.C. 154(b) by 623 days.

(21) Appl. No.: 09/634,720

(22) Filed: Aug. 7, 2000

(30) Foreign Application Priority Data

Aug. 11, 1999 (IL) .................................................. 131350

(51) Int. Cl.$^7$ .............................................. G06F 15/00
(52) U.S. Cl. ........................................................ 708/404
(58) Field of Search ................................ 708/400, 403, 708/404, 405, 406, 408, 409

(56) References Cited

U.S. PATENT DOCUMENTS 6,356,926 B1 * 3/2002 Andre ........................ 708/404
6,401,162 B1 * 6/2002 Nasserbakht ................... 711/5

* cited by examiner

Primary Examiner—Chuong Dinh Ngo
(74) Attorney, Agent, or Firm—Mark M. Friedman (57) ABSTRACT

A method of performing a FFT of a sequence of $N=B^n$ numbers, where B is a power of 2 and n is a positive integer. A pattern of storage locations for the $B^n$ numbers in M in-place memories is selected recursively, where M is a power of 2 that is less than B, wherein, if n=1, each in-place memory has storage locations for a different B/M of the B numbers, and wherein, if n is greater than 1, the pattern for storing $B^n$ numbers is a concatenation of B patterns for storing $B^{n-1}$ numbers, there being B/M successive sets of the patterns for storing $B^{n-1}$ numbers in the pattern for storing $B^n$ numbers when n is greater than 1, the patterns, for storing $B^{n-1}$ numbers, within each of the B/M successive sets, is mutually identical and is different from the patterns, for storing B numbers, of any other the set. The numbers are stored in the storage locations. An in-place radix-B DFT is performed on each of N/B groups of values stored in the storage locations. If n is greater than 1, a length N/B DFT is performed on each of B groups of N/B values stored in the storage locations, each group including N/(MB) values stored in each of the in-place memories.

20 Claims, 10 Drawing Sheets

| $0^i$ | $2^{ii}$ |
|---|---|
| $1^i$ | $3^{ii}$ |

| $0^i$ | $4^i$ | $8^{ii}$ | $C^{ii}$ |
|---|---|---|---|
| $1^i$ | $5^i$ | $9^{ii}$ | $D^{ii}$ |
| $2^{ii}$ | $6^{ii}$ | $A^i$ | $E^i$ |
| $3^{ii}$ | $7^{ii}$ | $B^i$ | $F^i$ |

FIG. 1 (PRIOR ART)

| $0^I$ | $2^{II}$ |
|---|---|
| $1^I$ | $3^{II}$ |

FIGURE 2

| $0^I$ | $4^I$ | $8^{II}$ | $C^{II}$ |
|---|---|---|---|
| $1^I$ | $5^I$ | $9^{II}$ | $D^{II}$ |
| $2^{II}$ | $6^{II}$ | $A^I$ | $E^I$ |
| $3^{II}$ | $7^{II}$ | $B^I$ | $F^I$ |

FIGURE 3

| | | | |
|---|---|---|---|
| $0^i$ | $10^i$ | $20^{ii}$ | $30^{ii}$ |
| $1^i$ | $11^i$ | $21^{ii}$ | $31^{ii}$ |
| $2^{ii}$ | $12^{ii}$ | $22^i$ | $32^i$ |
| $3^{ii}$ | $13^{ii}$ | $23^i$ | $33^i$ |
| $4^i$ | $14^i$ | $24^{ii}$ | $34^{ii}$ |
| $5^i$ | $15^i$ | $25^{ii}$ | $35^{ii}$ |
| $6^{ii}$ | $16^{ii}$ | $26^i$ | $36^i$ |
| $7^{ii}$ | $17^{ii}$ | $27^i$ | $37^i$ |
| $8^{ii}$ | $18^{ii}$ | $28^i$ | $38^i$ |
| $9^{ii}$ | $19^{ii}$ | $29^i$ | $39^i$ |
| $A^i$ | $1A^i$ | $2A^{ii}$ | $3A^{ii}$ |
| $B^i$ | $1B^i$ | $2B^{ii}$ | $3B^{ii}$ |
| $C^{ii}$ | $1C^{ii}$ | $2C^i$ | $3C^i$ |
| $D^{ii}$ | $1D^{ii}$ | $2D^i$ | $3D^i$ |
| $E^i$ | $1E^i$ | $2E^{ii}$ | $3E^{ii}$ |
| $F^i$ | $1F^i$ | $2F^{ii}$ | $3F^{ii}$ |

| 0' | 4" |
|---|---|
| 1' | 5" |
| 2' | 6" |
| 3' | 7" |

FIGURE 6

| 0' | 8' | 10' | 18' | 20" | 28" | 30" | 38" |
|---|---|---|---|---|---|---|---|
| 1' | 9' | 11' | 19' | 21" | 29" | 31" | 39" |
| 2' | A' | 12' | 1A' | 22" | 2A" | 32" | 3A" |
| 3' | B' | 13' | 1B' | 23" | 2B" | 33" | 3B" |
| 4" | C" | 14" | 1C" | 24' | 2C' | 34' | 3C' |
| 5" | D" | 15" | 1D" | 25' | 2D' | 35' | 3D' |
| 6" | E" | 16" | 1E" | 26' | 2E' | 36' | 3E' |
| 7" | F" | 17" | 1F" | 27' | 2F' | 37' | 3F' |

| $0^i$ | $1^i$ | $2^{ii}$ | $3^{ii}$ | $4^{iii}$ | $5^{iii}$ | $6^{iv}$ | $7^{iv}$ |

FIGURE 9

| $0^i$ | $8^i$ | $10^{ii}$ | $18^{ii}$ | $20^{iii}$ | $28^{iii}$ | $30^{iv}$ | $38^{iv}$ |
| $1^i$ | $9^i$ | $11^{ii}$ | $19^{ii}$ | $21^{iii}$ | $29^{iii}$ | $31^{iv}$ | $39^{iv}$ |
| $2^{ii}$ | $A^{ii}$ | $12^i$ | $1A^i$ | $22^{iv}$ | $2A^{iv}$ | $32^{iii}$ | $3A^{iii}$ |
| $3^{ii}$ | $B^{ii}$ | $13^i$ | $1B^i$ | $23^{iv}$ | $2B^{iv}$ | $33^{iii}$ | $3B^{iii}$ |
| $4^{iii}$ | $C^{iii}$ | $14^{iv}$ | $1C^{iv}$ | $24^i$ | $2C^i$ | $34^{ii}$ | $3C^{ii}$ |
| $5^{iii}$ | $D^{iii}$ | $15^{iv}$ | $1D^{iv}$ | $25^i$ | $2D^i$ | $35^{ii}$ | $3D^{ii}$ |
| $6^{iv}$ | $E^{iv}$ | $16^{iii}$ | $1E^{iii}$ | $26^{ii}$ | $2E^{ii}$ | $36^i$ | $3E^i$ |
| $7^{iv}$ | $F^{iv}$ | $17^{iii}$ | $1F^{iii}$ | $27^{ii}$ | $2F^{ii}$ | $37^i$ | $3F^i$ |

FIGURE 10

| | | | | | | | |
|---|---|---|---|---|---|---|---|
| $0^i$ | $40^i$ | $80^{ii}$ | $C0^{ii}$ | $100^{iii}$ | $140^{iii}$ | $180^{iv}$ | $1C0^{iv}$ |
| $1^i$ | $41^i$ | $81^{ii}$ | $C1^{ii}$ | $101^{iii}$ | $141^{iii}$ | $181^{iv}$ | $1C1^{iv}$ |
| $2^{ii}$ | $42^{ii}$ | $82^i$ | $C2^i$ | $102^{iv}$ | $142^{iv}$ | $182^{iii}$ | $1C2^{iii}$ |
| $3^{ii}$ | $43^{ii}$ | $83^i$ | $C3^i$ | $103^{iv}$ | $143^{iv}$ | $183^{iii}$ | $1C3^{iii}$ |
| $4^{iii}$ | $44^{iii}$ | $84^{iv}$ | $C4^{iv}$ | $104^i$ | $144^i$ | $184^{ii}$ | $1C4^{ii}$ |
| $5^{iii}$ | $45^{iii}$ | $85^{iv}$ | $C5^{iv}$ | $105^i$ | $145^i$ | $185^{ii}$ | $1C5^{ii}$ |
| $6^{iv}$ | $46^{iv}$ | $86^{iii}$ | $C6^{iii}$ | $106^{ii}$ | $146^{ii}$ | $186^i$ | $1C6^i$ |
| $7^{iv}$ | $47^{iv}$ | $87^{iii}$ | $C7^{iii}$ | $107^{ii}$ | $147^{ii}$ | $187^i$ | $1C7^i$ |
| $8^i$ | $48^i$ | $88^{ii}$ | $C8^{ii}$ | $108^{iii}$ | $148^{iii}$ | $188^{iv}$ | $1C8^{iv}$ |
| $9^i$ | $49^i$ | $89^{ii}$ | $C9^{ii}$ | $109^{iii}$ | $149^{iii}$ | $189^{iv}$ | $1C9^{iv}$ |
| $A^{ii}$ | $4A^{ii}$ | $8A^i$ | $CA^i$ | $10A^{iv}$ | $14A^{iv}$ | $18A^{iii}$ | $1CA^{iii}$ |
| $B^{ii}$ | $4B^{ii}$ | $8B^i$ | $CB^i$ | $10B^{iv}$ | $14B^{iv}$ | $18B^{iii}$ | $1CB^{iii}$ |
| $C^{iii}$ | $4C^{iii}$ | $8C^{iv}$ | $CC^{iv}$ | $10C^i$ | $14C^i$ | $18C^{ii}$ | $1CC^{ii}$ |
| $D^{iii}$ | $4D^{iii}$ | $8D^{iv}$ | $CD^{iv}$ | $10D^i$ | $14D^i$ | $18D^{ii}$ | $1CD^{ii}$ |
| $E^{iv}$ | $4E^{iv}$ | $8E^{iii}$ | $CE^{iii}$ | $10E^{ii}$ | $14E^{ii}$ | $18E^i$ | $1CE^i$ |
| $F^{iv}$ | $4F^{iv}$ | $8F^{iii}$ | $CF^{iii}$ | $10F^{ii}$ | $14F^{ii}$ | $18F^i$ | $1CF^i$ |
| $10^{ii}$ | $50^{ii}$ | $90^i$ | $D0^i$ | $110^{iv}$ | $150^{iv}$ | $190^{iii}$ | $1D0^{iii}$ |
| $11^{ii}$ | $51^{ii}$ | $91^i$ | $D1^i$ | $111^{iv}$ | $151^{iv}$ | $191^{iii}$ | $1D1^{iii}$ |
| $12^i$ | $52^i$ | $92^{ii}$ | $D2^{ii}$ | $112^{iii}$ | $152^{iii}$ | $192^{iv}$ | $1D2^{iv}$ |
| $13^i$ | $53^i$ | $93^{ii}$ | $D3^{ii}$ | $113^{iii}$ | $153^{iii}$ | $193^{iv}$ | $1D3^{iv}$ |
| $14^{iv}$ | $54^{iv}$ | $94^{iii}$ | $D4^{iii}$ | $114^{ii}$ | $154^{ii}$ | $194^i$ | $1D4^i$ |
| $15^{iv}$ | $55^{iv}$ | $95^{iii}$ | $D5^{iii}$ | $115^{ii}$ | $155^{ii}$ | $195^i$ | $1D5^i$ |
| $16^{iii}$ | $56^{iii}$ | $96^{iv}$ | $D6^{iv}$ | $116^i$ | $156^i$ | $196^{ii}$ | $1D6^{ii}$ |
| $17^{iii}$ | $57^{iii}$ | $97^{iv}$ | $D7^{iv}$ | $117^i$ | $157^i$ | $197^{ii}$ | $1D7^{ii}$ |
| $18^{ii}$ | $58^{ii}$ | $98^i$ | $D8^i$ | $118^{iv}$ | $158^{iv}$ | $198^{iii}$ | $1D8^{iii}$ |
| $19^{ii}$ | $59^{ii}$ | $99^i$ | $D9^i$ | $119^{iv}$ | $159^{iv}$ | $199^{iii}$ | $1D9^{iii}$ |
| $1A^i$ | $5A^i$ | $9A^{ii}$ | $DA^{ii}$ | $11A^{iii}$ | $15A^{iii}$ | $19A^{iv}$ | $1DA^{iv}$ |
| $1B^i$ | $5B^i$ | $9B^{ii}$ | $DB^{ii}$ | $11B^{iii}$ | $15B^{iii}$ | $19B^{iv}$ | $1DB^{iv}$ |
| $1C^{iv}$ | $5C^{iv}$ | $9C^{iii}$ | $DC^{iii}$ | $11C^{ii}$ | $15C^{ii}$ | $19C^i$ | $1DC^i$ |
| $1D^{iv}$ | $5D^{iv}$ | $9D^{iii}$ | $DD^{iii}$ | $11D^{ii}$ | $15D^{ii}$ | $19D^i$ | $1DD^i$ |
| $1E^{iii}$ | $5E^{iii}$ | $9E^{iv}$ | $DE^{iv}$ | $11E^i$ | $15E^i$ | $19E^{ii}$ | $1DE^{ii}$ |
| $1F^{iii}$ | $5F^{iii}$ | $9F^{iv}$ | $DF^{iv}$ | $11F^i$ | $15F^i$ | $19F^{ii}$ | $1DF^{ii}$ |
| $20^{iii}$ | $60^{iii}$ | $A0^{iv}$ | $E0^{iv}$ | $120^i$ | $160^i$ | $1A0^{ii}$ | $1E0^{ii}$ |
| $21^{iii}$ | $61^{iii}$ | $A1^{iv}$ | $E1^{iv}$ | $121^i$ | $161^i$ | $1A1^{ii}$ | $1E1^{ii}$ |
| $22^{iv}$ | $62^{iv}$ | $A2^{iii}$ | $E2^{iii}$ | $122^{ii}$ | $162^{ii}$ | $1A2^i$ | $1E2^i$ |
| $23^{iv}$ | $63^{iv}$ | $A3^{iii}$ | $E3^{iii}$ | $123^{ii}$ | $163^{ii}$ | $1A3^i$ | $1E3^i$ |
| $24^i$ | $64^i$ | $A4^{ii}$ | $E4^{ii}$ | $124^{iii}$ | $164^{iii}$ | $1A4^{iv}$ | $1E4^{iv}$ |
| $25^i$ | $65^i$ | $A5^{ii}$ | $E5^{ii}$ | $125^{iii}$ | $165^{iii}$ | $1A5^{iv}$ | $1E5^{iv}$ |
| $26^{ii}$ | $66^{ii}$ | $A6^i$ | $E6^i$ | $126^{iv}$ | $166^{iv}$ | $1A6^{iii}$ | $1E6^{iii}$ |
| $27^{ii}$ | $67^{ii}$ | $A7^i$ | $E7^i$ | $127^{iv}$ | $167^{iv}$ | $1A7^{iii}$ | $1E7^{iii}$ |
| $28^{iii}$ | $68^{iii}$ | $A8^{iv}$ | $E8^{iv}$ | $128^i$ | $168^i$ | $1A8^{ii}$ | $1E8^{ii}$ |
| $29^{iii}$ | $69^{iii}$ | $A9^{iv}$ | $E9^{iv}$ | $129^i$ | $169^i$ | $1A9^{ii}$ | $1E9^{ii}$ |
| $2A^{iv}$ | $6A^{iv}$ | $AA^{iii}$ | $EA^{iii}$ | $12A^{ii}$ | $16A^{ii}$ | $1AA^i$ | $1EA^i$ |
| $2B^{iv}$ | $6B^{iv}$ | $AB^{iii}$ | $EB^{iii}$ | $12B^{ii}$ | $16B^{ii}$ | $1AB^i$ | $1EB^i$ |
| $2C^i$ | $6C^i$ | $AC^{ii}$ | $EC^{ii}$ | $12C^{iii}$ | $16C^{iii}$ | $1AC^{iv}$ | $1EC^{iv}$ |
| $2D^i$ | $6D^i$ | $AD^{ii}$ | $ED^{ii}$ | $12D^{iii}$ | $16D^{iii}$ | $1AD^{iv}$ | $1ED^{iv}$ |
| $2E^{ii}$ | $6E^{ii}$ | $AE^i$ | $EE^i$ | $12E^{iv}$ | $16E^{iv}$ | $1AE^{iii}$ | $1EE^{iii}$ |
| $2F^{ii}$ | $6F^{ii}$ | $AF^i$ | $EF^i$ | $12F^{iv}$ | $16F^{iv}$ | $1AF^{iii}$ | $1EF^{iii}$ |
| $30^{iv}$ | $70^{iv}$ | $B0^{iii}$ | $F0^{iii}$ | $130^{ii}$ | $170^{ii}$ | $1B0^i$ | $1F0^i$ |
| $31^{iv}$ | $71^{iv}$ | $B1^{iii}$ | $F1^{iii}$ | $131^{ii}$ | $171^{ii}$ | $1B1^i$ | $1F1^i$ |
| $32^{iii}$ | $72^{iii}$ | $B2^{iv}$ | $F2^{iv}$ | $132^i$ | $172^i$ | $1B2^{ii}$ | $1F2^{ii}$ |
| $33^{iii}$ | $73^{iii}$ | $B3^{iv}$ | $F3^{iv}$ | $133^i$ | $173^i$ | $1B3^{ii}$ | $1F3^{ii}$ |
| $34^{ii}$ | $74^{ii}$ | $B4^i$ | $F4^i$ | $134^{iv}$ | $174^{iv}$ | $1B4^{iii}$ | $1F4^{iii}$ |
| $35^{ii}$ | $75^{ii}$ | $B5^i$ | $F5^i$ | $135^{iv}$ | $175^{iv}$ | $1B5^{iii}$ | $1F5^{iii}$ |
| $36^i$ | $76^i$ | $B6^{ii}$ | $F6^{ii}$ | $136^{iii}$ | $176^{iii}$ | $1B6^{iv}$ | $1F6^{iv}$ |
| $37^i$ | $77^i$ | $B7^{ii}$ | $F7^{ii}$ | $137^{iii}$ | $177^{iii}$ | $1B7^{iv}$ | $1F7^{iv}$ |
| $38^{iv}$ | $78^{iv}$ | $B8^{iii}$ | $F8^{iii}$ | $138^{ii}$ | $178^{ii}$ | $1B8^i$ | $1F8^i$ |
| $39^{iv}$ | $79^{iv}$ | $B9^{iii}$ | $F9^{iii}$ | $139^{ii}$ | $179^{ii}$ | $1B9^i$ | $1F9^i$ |
| $3A^{iii}$ | $7A^{iii}$ | $BA^{iv}$ | $FA^{iv}$ | $13A^i$ | $17A^i$ | $1BA^{ii}$ | $1FA^{ii}$ |
| $3B^{iii}$ | $7B^{iii}$ | $BB^{iv}$ | $FB^{iv}$ | $13B^i$ | $17B^i$ | $1BB^{ii}$ | $1FB^{ii}$ |
| $3C^{ii}$ | $7C^{ii}$ | $BC^i$ | $FC^i$ | $13C^{iv}$ | $17C^{iv}$ | $1BC^{iii}$ | $1FC^{iii}$ |
| $3D^{ii}$ | $7D^{ii}$ | $BD^i$ | $FD^i$ | $13D^{iv}$ | $17D^{iv}$ | $1BD^{iii}$ | $1FD^{iii}$ |
| $3E^i$ | $7E^i$ | $BE^{ii}$ | $FE^{ii}$ | $13E^{iii}$ | $17E^{iii}$ | $1BE^{iv}$ | $1FE^{iv}$ |
| $3F^i$ | $7F^i$ | $BF^{ii}$ | $FF^{ii}$ | $13F^{iii}$ | $17F^{iii}$ | $1BF^{iv}$ | $1FF^{iv}$ |

FIGURE 11

| | | | | | | | |
|---|---|---|---|---|---|---|---|
| 00 0 | 00 0 | 00 0 | 00 0 | 00 0 | 00 0 | 00 0 | 00 0 |
| 00 0 | 1F F | 1F E | 1F D | 1F C | 1F B | 1F A | 1F 9 |
| 00 0 | 1F E | 1F C | 1F A | 1F 8 | 1F 6 | 1F 4 | 1F 2 |
| 00 0 | 1F D | 1F A | 1F 7 | 1F 4 | 1F 1 | 1E E | 1E B |
| 00 0 | 1F C | 1F 8 | 1F 4 | 1F 0 | 1E C | 1E 8 | 1E 4 |
| 00 0 | 1F B | 1F 6 | 1F 1 | 1E C | 1E 7 | 1E 2 | 1D D |
| 00 0 | 1F A | 1F 4 | 1E E | 1E 8 | 1E 2 | 1D C | 1D 6 |
| 00 0 | 1F 9 | 1F 2 | 1E B | 1E 4 | 1D D | 1D 6 | 1C F |
| 00 0 | 1F 8 | 1F 0 | 1E 8 | 1E 0 | 1D 8 | 1D 0 | 1C 8 |
| 00 0 | 1F 7 | 1E E | 1E 5 | 1D C | 1D 3 | 1C A | 1C 1 |
| 00 0 | 1F 6 | 1E C | 1E 2 | 1D 8 | 1C E | 1C 4 | 1B A |
| 00 0 | 1F 5 | 1E A | 1D F | 1D 4 | 1C 9 | 1B E | 1B 3 |
| 00 0 | 1F 4 | 1E 8 | 1D C | 1D 0 | 1C 4 | 1B 8 | 1A C |
| 00 0 | 1F 3 | 1E 6 | 1D 9 | 1C C | 1B F | 1B 2 | 1A 5 |
| 00 0 | 1F 2 | 1E 4 | 1D 6 | 1C 8 | 1B A | 1A C | 19 E |
| 00 0 | 1F 1 | 1E 2 | 1D 3 | 1C 4 | 1B 5 | 1A 6 | 19 7 |
| 00 0 | 1F 0 | 1E 0 | 1D 0 | 1C 0 | 1B 0 | 1A 0 | 19 0 |
| 00 0 | 1E F | 1D E | 1C D | 1B C | 1A B | 19 A | 18 9 |
| 00 0 | 1E E | 1D C | 1C A | 1B 8 | 1A 6 | 19 4 | 18 2 |
| 00 0 | 1E D | 1D A | 1C 7 | 1B 4 | 1A 1 | 18 E | 17 B |
| 00 0 | 1E C | 1D 8 | 1C 4 | 1B 0 | 19 C | 18 8 | 17 4 |
| 00 0 | 1E B | 1D 6 | 1C 1 | 1A C | 19 7 | 18 2 | 16 D |
| 00 0 | 1E A | 1D 4 | 1B E | 1A 8 | 19 2 | 17 C | 16 6 |
| 00 0 | 1E 9 | 1D 2 | 1B B | 1A 4 | 18 D | 17 6 | 15 F |
| 00 0 | 1E 8 | 1D 0 | 1B 8 | 1A 0 | 18 8 | 17 0 | 15 8 |
| 00 0 | 1E 7 | 1C E | 1B 5 | 19 C | 18 3 | 16 A | 15 1 |
| 00 0 | 1E 6 | 1C C | 1B 2 | 19 8 | 17 E | 16 4 | 14 A |
| 00 0 | 1E 5 | 1C A | 1A F | 19 4 | 17 9 | 15 E | 14 3 |
| 00 0 | 1E 4 | 1C 8 | 1A C | 19 0 | 17 4 | 15 8 | 13 C |
| 00 0 | 1E 3 | 1C 6 | 1A 9 | 18 C | 16 F | 15 2 | 13 5 |
| 00 0 | 1E 2 | 1C 4 | 1A 6 | 18 8 | 16 A | 14 C | 12 E |
| 00 0 | 1E 1 | 1C 2 | 1A 3 | 18 4 | 16 5 | 14 6 | 12 7 |
| 00 0 | 1E 0 | 1C 0 | 1A 0 | 18 0 | 16 0 | 14 0 | 12 0 |
| 00 0 | 1D F | 1B E | 19 D | 17 C | 15 B | 13 A | 11 9 |
| 00 0 | 1D E | 1B C | 19 A | 17 8 | 15 6 | 13 4 | 11 2 |
| 00 0 | 1D D | 1B A | 19 7 | 17 4 | 15 1 | 12 E | 10 B |
| 00 0 | 1D C | 1B 8 | 19 4 | 17 0 | 14 C | 12 8 | 10 4 |
| 00 0 | 1D B | 1B 6 | 19 1 | 16 C | 14 7 | 12 2 | 0F D |
| 00 0 | 1D A | 1B 4 | 18 E | 16 8 | 14 2 | 11 C | 0F 6 |
| 00 0 | 1D 9 | 1B 2 | 18 B | 16 4 | 13 D | 11 6 | 0E F |
| 00 0 | 1D 8 | 1B 0 | 18 8 | 16 0 | 13 8 | 11 0 | 0E 8 |
| 00 0 | 1D 7 | 1A E | 18 5 | 15 C | 13 3 | 10 A | 0E 1 |
| 00 0 | 1D 6 | 1A C | 18 2 | 15 8 | 12 E | 10 4 | 0D A |
| 00 0 | 1D 5 | 1A A | 17 F | 15 4 | 12 9 | 0F E | 0D 3 |
| 00 0 | 1D 4 | 1A 8 | 17 C | 15 0 | 12 4 | 0F 8 | 0C C |
| 00 0 | 1D 3 | 1A 6 | 17 9 | 14 C | 11 F | 0F 2 | 0C 5 |
| 00 0 | 1D 2 | 1A 4 | 17 6 | 14 8 | 11 A | 0E C | 0B E |
| 00 0 | 1D 1 | 1A 2 | 17 3 | 14 4 | 11 5 | 0E 6 | 0B 7 |
| 00 0 | 1D 0 | 1A 0 | 17 0 | 14 0 | 11 0 | 0E 0 | 0B 0 |
| 00 0 | 1C F | 19 E | 16 D | 13 C | 10 B | 0D A | 0A 9 |
| 00 0 | 1C E | 19 C | 16 A | 13 8 | 10 6 | 0D 4 | 0A 2 |
| 00 0 | 1C D | 19 A | 16 7 | 13 4 | 10 1 | 0C E | 09 B |
| 00 0 | 1C C | 19 8 | 16 4 | 13 0 | 0F C | 0C 8 | 09 4 |
| 00 0 | 1C B | 19 6 | 16 1 | 12 C | 0F 7 | 0C 2 | 08 D |
| 00 0 | 1C A | 19 4 | 15 E | 12 8 | 0F 2 | 0B C | 08 6 |
| 00 0 | 1C 9 | 19 2 | 15 B | 12 4 | 0E D | 0B 6 | 07 F |
| 00 0 | 1C 8 | 19 0 | 15 8 | 12 0 | 0E 8 | 0B 0 | 07 8 |
| 00 0 | 1C 7 | 18 E | 15 5 | 11 C | 0E 3 | 0A A | 07 1 |
| 00 0 | 1C 6 | 18 C | 15 2 | 11 8 | 0D E | 0A 4 | 06 A |
| 00 0 | 1C 5 | 18 A | 14 F | 11 4 | 0D 9 | 09 E | 06 3 |
| 00 0 | 1C 4 | 18 8 | 14 C | 11 0 | 0D 4 | 09 8 | 05 C |
| 00 0 | 1C 3 | 18 6 | 14 9 | 10 C | 0C F | 09 2 | 05 5 |
| 00 0 | 1C 2 | 18 4 | 14 6 | 10 8 | 0C A | 08 C | 04 E |
| 00 0 | 1C 1 | 18 2 | 14 3 | 10 4 | 0C 5 | 08 6 | 04 7 |

DATA STORAGE PATTERNS FOR FAST FOURIER TRANSFORMS

FIELD AND BACKGROUND OF THE INVENTION

The present invention relates to Fast Fourier Transforms and, more particularly, to methods of data storage that are particularly useful in VLSI implementations of in-place FFT algorithms.

Since its rediscovery by Cooley and Tukey in 1965, the Fast Fourier Transform (FFT) has found wide application in fields such as digital signal processing. A general review of the state of the art in FFTs is found in P. Duhamel and M. Vetterli, "Fast Fourier Transforms: a tutorial review and a state of the art", *Signal Processing* vol. 19, pp. 259–299 (1990), which is incorporated by reference for all purposes as if fully set forth herein.

Figure 1:
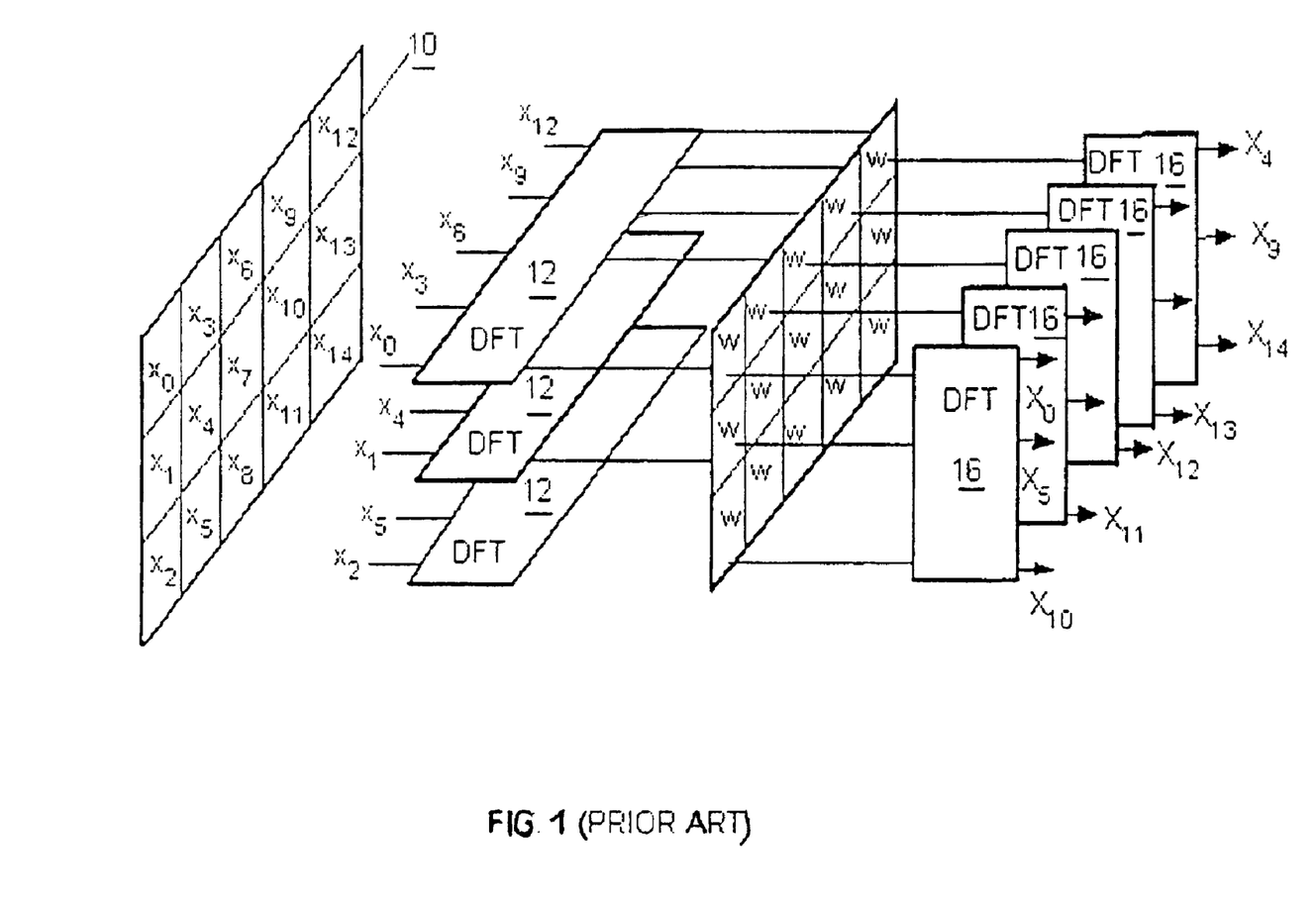
FIG. 1 illustrates a prior art FFT.

One particular class of FFTs is the in-place Cooley-Tukey FFT. FIG. 1, which is adapted from FIG. 1 of Duhamel and Vetterli, illustrates this style of FFT. This particular example shows the implementation of a 15-point FFT as a succession of radix-5 and radix-3 Discrete Fourier Transforms (DFTs). An input sequence of 15 complex numbers $x_0$ through $x_{14}$ is stored in column order in an array 10 of 3 rows and 5 columns, as shown. The first step of the FFT is three radix-5 DFTs 12 of the three rows of array 10. DFTs 12 are performed in place: the numbers stored in each row of array 10 are read and transformed, and the transformed numbers replace the original numbers in array 10. The second step of the FFT is the multiplication, also in place, of each number now stored in array 10 by a corresponding "twiddle factor" from a 3 row, 5 column array 14 of twiddle factors w that are integral powers of $\exp(-2\pi j/15)$, where j is the square root of $-1$. (In general, the twiddle factors are integral powers of $\exp(-2\pi j/N)$, where N is the length of the FFT.) The third step of the FFT is five radix-3 DFTs 16 of the five columns now stored in array 10. This third step also is performed in place: the numbers stored in each column of array 10 are read and transformed, and the transformed numbers replace the numbers stored in array 10 prior to the radix-3 DFTs. The final output sequence of the transform, 15 complex numbers $x_0$ through $x_{14}$, is read from array 10 in row order, as shown.

As noted by Duhamel and Vetterli, most of the effort invested in optimizing the implementation of FFTs has been directed towards reducing the number of arithmetic operations performed. The net speed of an FFT implementation also depends on the speed at which numbers are retrieved from memory and stored in memory. This is particularly true in the case of very large scale integration (VLSI) implementations, in which the DFTs are performed by dedicated hardware.

There is thus a widely recognized need for, and it would be highly advantageous to have, an efficient method for storing and retrieving the numbers used in an in-place FFT.

SUMMARY OF THE INVENTION

According to the present invention there is provided a method of performing a FFT of a sequence of $N=B^n$ numbers, where B is a power of 2 and n is a positive integer, including the steps of: (a) recursively selecting a pattern of storage locations for the $B^n$ numbers in M in-place memories, M being a power of 2 that is less than B, wherein, if n=1, each in-place memory has storage locations for a different B/M of the B numbers, and wherein, if n is greater than 1, the pattern for storing $B^n$ numbers is a concatenation of B the patterns for storing $B^{n-1}$ numbers, there being B/M successive sets of the patterns for storing $B^{n-1}$ numbers in the pattern for storing $B^n$ numbers when n is greater than 1, the patterns, for storing $B^{n-1}$ numbers, within each of the B/M successive sets, being mutually identical and being different from the patterns, for storing $B^{n-1}$ numbers, of any other the set; (b) storing the numbers in the storage locations; (c) performing an in-place radix-B DFT on each of N/B groups of values stored in the storage locations; and (d) if n is greater than 1, performing a length N/B DFT on each of B groups of N/B values stored in the storage locations, each group including N/(MB) values stored in each of the in-place memories.

According to the present invention there is provided a device for performing an FFT of a sequence of $N=B^n$ numbers, where B is a power of 2 and n is a positive integer, including: (a) M in-place memories, M being a power of 2 that is less than B; (b) a software module including a plurality of instructions for storing the N numbers in corresponding storage locations in the in-place memories according to one of a recursively derived plurality of patterns of the storage locations, the pattern for n=1 being such that a different B/M of the N numbers is stored in each in-place memories, and the pattern for n greater than 1 being a concatenation of B of the patterns for n−1, there being B/M successive sets of the patterns for n−1 in the pattern for n greater than w, the patterns for n−1 within each of the B/M successive sets being mutually identical and being different from the patterns for N−1 of any other the set; (c) a master processor for executing the instructions, thereby storing N values in N the storage locations; and (d) at least one FFT processor for performing a radix-B FFT on the N values taken B at a time.

According to the present invention there is provided a method of providing a plurality of complex numbers of unit modulus to a computational process, including the steps of: (a) factoring each complex number into a most significant factor and a least significant factor; (b) storing the most significant factors in a most significant factor memory; and (c) storing at least a part of each least significant factor in a least significant factor memory.

According to the present invention there is provided a method of performing a FFT of a sequence of $N=CB^n$ numbers, where B is a power of 2, C is a power of 2 that is less than B, and n is a positive integer, including the steps of: (a) recursively selecting a pattern of storage locations for $B^{n+1}$ numbers in M in-place memories, M being a power of 2 that is less than B, starting from a base storage pattern, for B numbers, wherein each in-place memory has storage locations for a different B/M of the B numbers, each subsequently selected pattern for storing $B^m$ numbers, where m is an integer greater than 1, being a concatenation of B the patterns for storing $B^{m-1}$ numbers, there being B/M successive sets of the patterns for storing $B^{m-1}$ numbers in the pattern for storing $B^m$ numbers, the patterns, for storing $B^{m-1}$ numbers, within each of the B/M successive sets, being mutually identical and being different from the patterns, for storing $B^{m-1}$ numbers, of any other set; (b) storing the N numbers in N of the storage locations for $B^{n+1}$ numbers; (c) performing an in-place radix-C DFT on each of N/C groups of values stored in the N storage locations; and (d) performing a length $B^n$ DFT on each of C groups of $B^n$ values stored in the N storage locations, each group including $B^n/M$ values stored in each of the in-place memories.

According to the present invention there is provided a device for performing an FFT of a sequence of $N=CB_n$ numbers, where B is a power of 2, C is a power of 2 that is less than B, and n is a positive integer, including: (a) M in-place memories, M being a power of 2 that is less than B; (b) a software module including a plurality of instructions for storing the N numbers in corresponding storage locations in the in-place memories according to a recursively derived pattern of storage locations for storing $B^{n+1}$ numbers, a base pattern of the recursive derivation being a pattern for storing B numbers, such that a different B/M of the B numbers is stored in each of the in-place memories, and each subsequently derived pattern for storing $B^m$ numbers, where m is an integer greater than 1, being a concatenation of B of the patterns for storing $B^{m-1}$ numbers, there being B/M successive sets of the patterns for storing $B^{m-1}$ numbers in the pattern for storing $B^m$ numbers, the patterns for storing $B^{m-1}$ numbers, within each of the B/M successive sets, being mutually identical and being different from the patterns, for storing $B^{m-1}$ numbers, of any other set; (c) a master processor for executing the instructions, thereby storing N values in N of the storage locations; and (d) at least one FFT processor for performing: (i) a radix-B FFT on the N values taken B at a time, and (ii) a radix-C FFT on the N values taken C at a time.

The primary embodiment of the present invention is directed at FFTs of input sequences of $N=B^n$ numbers, where B is a power of 2. These numbers are stored in array 10 in a manner that allows efficient storage and retrieval using M random access memories that preferably are dual-ported memories but optionally are single-ported memories. A dual-ported memory is a random access device to which two values may be written simultaneously at two different storage locations or from which two values may be read simultaneously at two different storage locations. Note that, because the input and output numbers and the intermediate values are complex, each storage location includes enough room for two real values, i.e., the real and imaginary parts of the complex value stored therein. The addresses of the storage locations are provided on two data buses. These random access memories, which are used to store the input numbers, the output numbers and the intermediate values, are termed herein "in-place memories".

At every stage in the FFT, equal numbers of complex values are stored in each of the M in-place memories, and individual complex values (single-ported case) or pairs of complex values (dual-ported case) always are retrieved simultaneously from all M in-place memories and always are stored simultaneously in all M in-place memories. The basic storage pattern, for the case n=1 ($N=B^1=B$), has N/M=B/M complex numbers stored in each of the M in-place memories. The storage patterns for n>1 are built recursively from the n=1 storage pattern.

In the basic case of n=1, one radix-B FFT (or DFT) suffices to effect the desired transform. When n is greater than 1, the overall FFT is implemented as a succession of radix-B DFTs, as described above. The row-wise DFTs of the first step are radix-B DFTs. The column-wise DFTs of the third step also are composed of radix-B DFTs. When n=2, the column-wise DFTs are radix-B DFTs. When n is greater than 2, the column-wise DFTs are built recursively from radix-B DFTs. The radix-B DFTs may be implemented in hardware, as dedicated processors, or may be implemented in software as radix-B FFTs.

More generally, the scope of the present invention includes FFTs of sequences of $CB^n$ input numbers, where B is a power of 2 and C is a power of 2 that is less than B. A storage pattern for $B^{n+1}$ input numbers is determined recursively as in the primary embodiment of the present invention, and only $CB^n$ of the storage locations are actually used, preferably in a manner that balances the loads on the memories used to store the numbers in array 10. For example, according to one preferred embodiment of the present invention, the first half of the input numbers are stored in the last $CB^n/2$ of the first half of the $B^{n+1}$ storage locations and the second half of the input numbers are stored in the first $CB^n/2$ of the last half of the $B^{n+1}$ storage locations. The row-wise DFTs of the first step are radix-C DFTs. The column-wise DFTs of the third step are composed of radix-B DFTs as in the primary embodiment of the present invention.

The present invention also includes a method for storing the twiddle factors.

As noted above, each twiddle factor is an integral power of $\exp(-2\pi j/N)$. This integer is partitioned into a least significant part and a most significant part. The twiddle factor is the product of $\exp(-2\pi j/N)$ raised to the power of the most significant part of the integral exponent and $\exp(-2\pi j/N)$ raised to the power of the least significant part of the integral exponent $\exp(-2\pi j/N)$ raised to the power of the most significant part of the integral exponent is called herein the "most significant factor". $\exp(-2\pi j/N)$ raised to the power of the least significant part of the integral exponent is called herein the "least significant factor". Many twiddle factors share the same most significant factor or the same least significant factor. To minimize the storage devoted to the twiddle factors, the most significant factors and the least significant factors are stored separately, and are multiplied to recover the twiddle factors.

Those skilled in the art will recognize that this method for storing and using twiddle factors has applications beyond FFTs. This method is applicable to any computational process involving a plurality of complex numbers z of unit modulus, i.e., complex numbers z such that $|z|=1$, that can be optimally partitioned into least significant parts and most significant parts. Such applications occur in the fields of radar, communications and signal processing.

A device of the present invention includes a master processor for overall control of the device, two or more in-place memories, a read-only instruction store that includes a software model containing instructions for storing the input numbers and the intermediate values in accordance with the method of the present invention, and one or more dedicated FFT processors for performing the short DFTs of the first and third steps. Preferably, the device also includes two more read-only memories for the most and least significant factors of the twiddle factors and a complex multiplier for multiplying the most and least significant factors to produce the twiddle factors and for multiplying the intermediate values stored in the in-place memories by their respective twiddle factors in the second step.

It will be appreciated by those skilled in the art that the present invention may be used for inverse FFTs as well as for forward FFTs.

BRIEF DESCRIPTION OF THE DRAWINGS

The invention is herein described, by way of example only, with reference to the accompanying drawings, wherein:

FIG. 8 illustrates the storage location pattern of the present invention in the case N=512, B=8, n=3, M=2;

FIG. 11 illustrates the storage location pattern of the present invention in the case N=512, B=8, n=3, M=4;

FIG. 12 shows an address pattern for storing most and least significant factors of twiddle factors in the case N=512, B=8, n=3, M=2;

DESCRIPTION OF THE PREFERRED EMBODIMENTS

The present invention is of a method of storing the numbers used in in-place FFTs. Specifically, the present invention can be used to optimize a VLSI implementation of an in-place FFT.

The principles and operation of FFT storage and retrieval according to the present invention may be better understood with reference to the drawings and the accompanying description.

Figure 2:
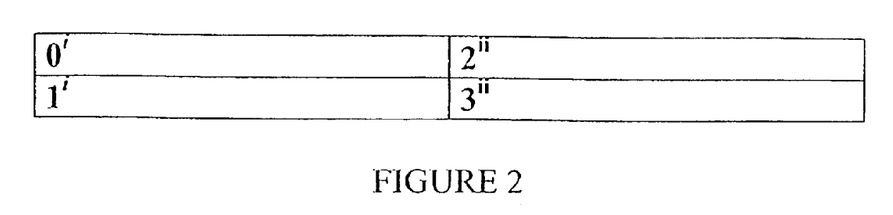
FIG. 2 illustrates the storage location pattern of the present invention in the case N=4, B=4, n=1, M=2.

Referring again to the drawings, FIG. 2 shows the basic storage pattern (n=1) of the primary embodiment of the present invention, for the case of B=4 and two dual-ported in-place memories. Only the subscripts of the input sequence $\{x_0 \ldots x_3\}$ are shown. The first two numbers of the sequence, $x_0$ and $x_1$, are stored in the first dual-ported memory. The second two numbers of the sequence, $x_2$ and $x_3$, are stored in the second dual-ported memory. Correspondingly, "0" and "1" in FIG. 2 have the superscript "i", and "2" and "3" in FIG. 2 have the superscript "ii".

Figure 3:
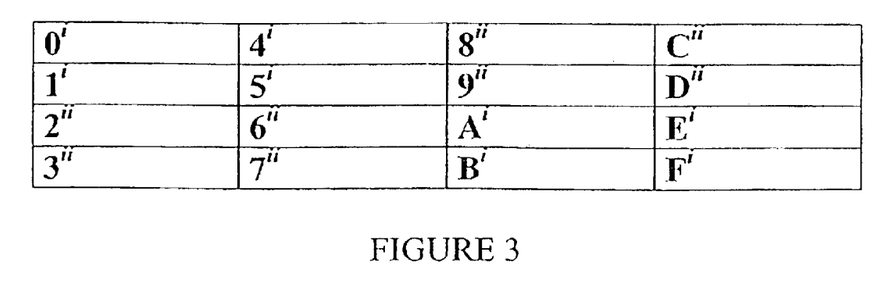
FIG. 3 illustrates the storage location pattern of the present invention in the case N=16, B=4, n=2, M=2.

FIG. 3 shows how the storage pattern of array 10 for n=2 (N=16) is constructed from the n=1 storage pattern of FIG. 2. The storage pattern of FIG. 3 is a concatenation of four of the storage patterns of FIG. 2. Note that the subscripts are written in hexadecimal notation. As in FIG. 2, the subscripts of the numbers stored in the first dual-ported memory have the superscript "i", and the subscripts of the numbers stored in the second dual-ported memory have the superscript "ii". The last two n=1 storage patterns are inverted relative to the first two n=1 storage patterns: in the last two n=1 storage patterns, the first two numbers are stored in the second dual-ported memory and the last two numbers are stored in the first dual-ported memory.

In each of the four row-wise radix-4 DFTs of the first step, two input numbers are retrieved from the first dual-ported memory and two input numbers are retrieved from the second dual ported memory at the start of the DFT, and two intermediate values are stored in the first dual-ported memory and two intermediate values are stored in the second dual-ported memory at the end of the DFT. Similarly, in each of the four column-wise radix-4 DFTs of the third step, two intermediate values are retrieved from the first dual-ported memory and two intermediate values are retrieved from the second dual ported memory at the start of the DFT, and two output numbers are stored in the first dual-ported memory and two output numbers are stored in the second dual-ported memory at the end of the DFT.

Figure 4:
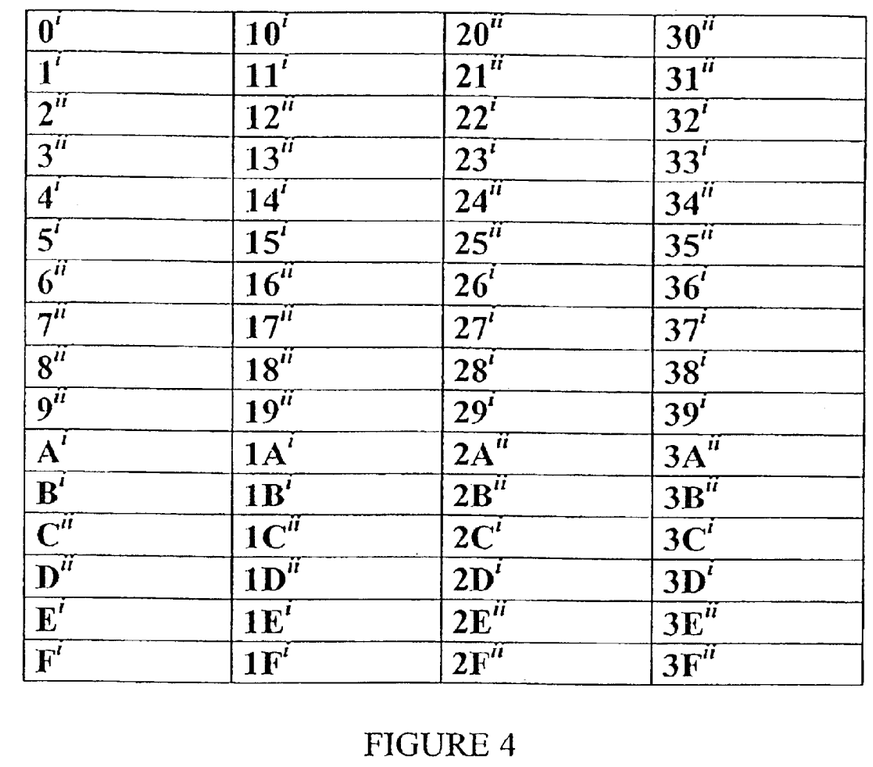
FIG. 4 illustrates the storage location pattern of the present invention in the case N=64, B=4, n=3, M=2.

FIG. 4 shows how the storage pattern of array 10 for n=3 (N=64) is constructed from the n=2 storage pattern of FIG. 3. The storage pattern of FIG. 4 is a concatenation of four of the storage patterns of FIG. 3, with the last two n=2 storage patterns inverted relative to the first two n=2 storage patterns.

As in the n=2 case, in each of the row-wise radix-4 DFTs of the first step, two input numbers are retrieved from the first dual-ported memory and two input numbers are retrieved from the second dual ported memory at the start of the DFT, and two intermediate values are stored in the first dual-ported memory and two intermediate values are stored in the second dual-ported memory at the end of the DFT. The four column-wise DFTs of the third step are 16-point DFTs. Because the storage pattern of each column of FIG. 4 either is identical to the storage pattern of FIG. 3 or is the inverse of the storage pattern of FIG. 3, each of these 16-point DFTs is effected as a n=2 FFT, composed of radix-4 FFTs, as described above with reference to FIG. 3.

Figure 5:
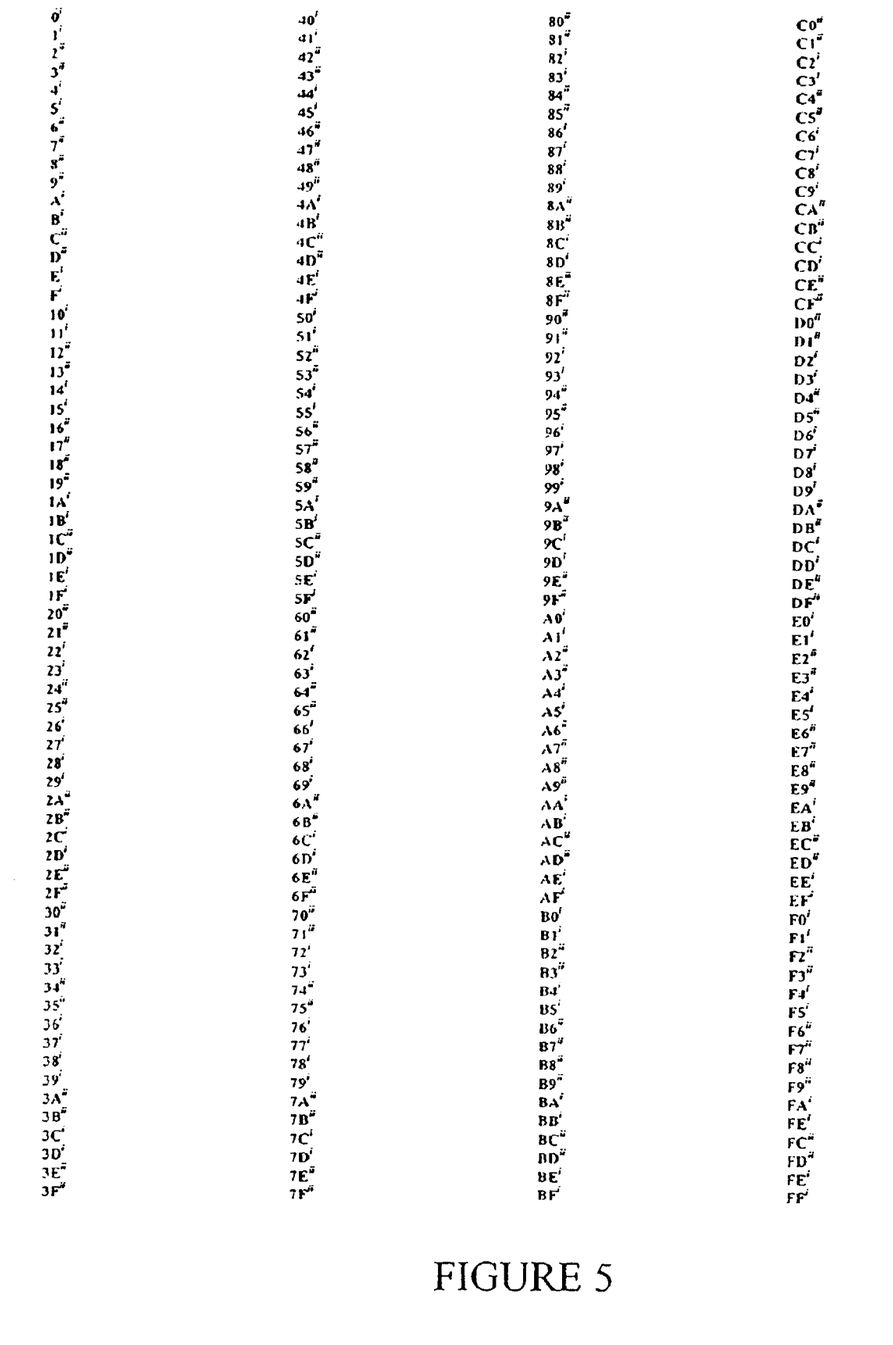
FIG. 5 illustrates the storage location pattern of the present invention in the case N=256, B=4, n=4, M=2.

FIG. 5 shows how the storage pattern of array 10 for n=4 (N=256) is constructed from the n=3 storage pattern of FIG. 4. The storage pattern of FIG. 5 is a concatenation of four of the storage patterns of FIG. 4, with the last two n=3 storage patterns inverted relative to the first two n=3 storage patterns.

As in the n=2 and n=3 cases, in each of the row-wise radix-4 DFTs of the first step, two input numbers are retrieved from the first dual-ported memory and two input numbers are retrieved from the second dual ported memory at the start of the DFT, and two intermediate values are stored in the first dual-ported memory and two intermediate values are stored in the second dual-ported memory at the end of the DFT. The four column-wise DFTs of the third step are 64-point DFTs. Because the storage pattern of each column of FIG. 5 either is identical to the storage pattern of FIG. 4 or is the inverse of the storage pattern of FIG. 4, each of these 64-point DFTs is effected as a n=3 FFT, composed of radix-4 FFTs, as described above with reference to FIG. 4.

It will be clear to those skilled in the art how to generalize this procedure recursively to higher values of n.

Figure 6:
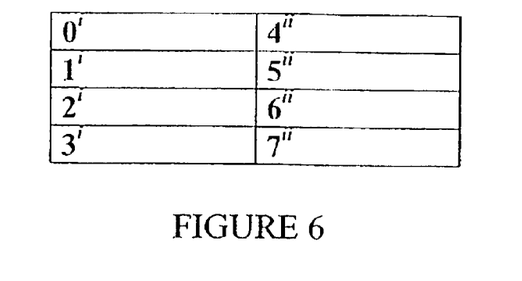
FIG. 6 illustrates the storage location pattern of the present invention in the case N=8, B=8, n=1, M=2.

FIG. 6 shows the basic storage pattern (n=1) of the primary embodiment of the present invention, for the case of B=8 and two dual-ported in-place memories. The first four numbers of the sequence, $x_0$ through $x_3$, are stored in the first dual-ported memory. The last four numbers of the sequence, $x_4$ through $x_7$, are stored in the second dual-ported memory.

Figure 7:
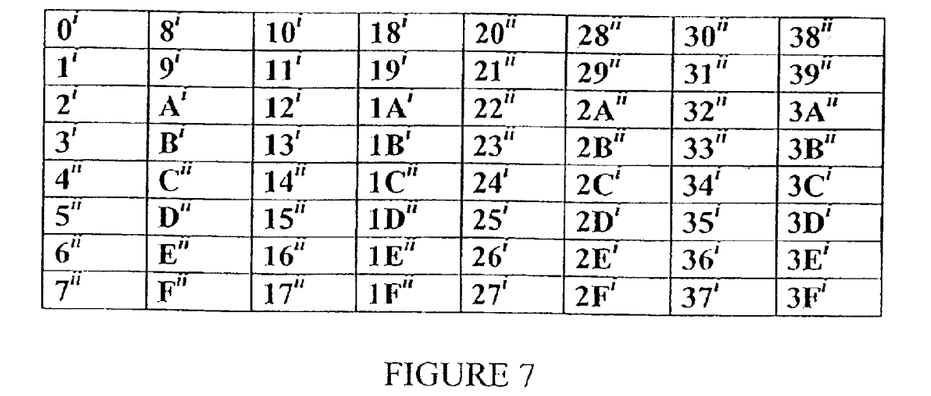
FIG. 7 illustrates the storage location pattern of the present invention in the case N=64, B=8, n=2, M=2.

FIG. 7 shows how the storage pattern of array 10 for n=2 (N=64) is constructed from the n=1 storage pattern of FIG. 6. The storage pattern of FIG. 7 is a concatenation of eight of the storage patterns of FIG. 6, with the last four n=1 storage patterns inverted relative to the first four n=1 storage patterns. As in FIG. 6, the subscripts of the numbers stored in the first dual-ported memory have the superscript "i", and the subscripts of the numbers stored in the second dual-ported memory have the superscript "ii".

Each of the eight row-wise radix-8 DFTs of the first step requires two retrieval cycles and two storage cycles. In the first retrieval cycle, two input numbers are retrieved from the first dual-ported memory and two input numbers are retrieved from the second dual port memory. In the second retrieval cycle, another two input numbers are retrieved from the first dual-ported memory and another two input numbers are retrieved from the second dual-ported memory. For example, in the first retrieval cycle of the first row-wise DFT, $x_0$ and $x_8$ are retrieved from the first dual-ported memory and $x_{20}$ and $x_{28}$ are retrieved from the second dual-ported memory. Then, in the second retrieval cycle of the first row-wise DFT, $x_{10}$ and $x_{18}$ are retrieved from the first dual-ported memory and $x_{30}$ and $x_{38}$ are retrieved from the second dual-ported memory. Similarly, in the first storage cycle, two intermediate values are stored in the first dual-ported memory and two intermediate values are stored in the second dual-ported memory, and in the second storage cycle, two other intermediate values are stored in the first dual-ported memory and two other intermediate values are stored in the second dual-ported memory. For example, in the first storage cycle of the eighth row-wise DFT, $x_7$ and $x_F$ are overwritten in the second dual-ported memory by the first and second output values of the DFT and $x_{27}$ and $x_{2F}$ are overwritten in the first dual-ported memory by the fifth and sixth output values of the DFT. Then, in the second retrieval cycle of the eighth row-wise DFT, $x_{17}$ and $x_{1F}$ are overwritten in the second dual-ported memory by the third and fourth output values of the DFT and $x_{37}$ and $x_{3F}$ are overwritten in the first dual-ported memory by the seventh and eighth output values of the DFT.

Similarly, each of the eight column-wise radix-8 DFTs of the third step requires two retrieval cycles and two storage cycles. In the first retrieval cycle, two intermediate values are retrieved from the first dual-ported memory and two intermediate values are retrieved from the second dual port memory. In the second retrieval cycle, another two intermediate values are retrieved from the first dual-ported memory and another two intermediate values are retrieved from the second dual-ported memory. In the first storage cycle, two output numbers are stored in the first dual-ported memory and two output numbers are stored in the second dual-ported memory, and in the second storage cycle, two other output numbers are stored in the first dual-ported memory and two other output numbers are stored in the second dual-ported memory.

FIG. 8 shows how the storage pattern of array 10 for n=3 (N=512) is constructed from the n=2 storage pattern of FIG. 7. The storage pattern of FIG. 8 is a concatenation of eight of the storage patterns of FIG. 7, with the last four n=2 storage patterns inverted relative to the first four n=2 storage patterns.

As in the n=2 case, each of the 64 row-wise radix-8 DFTs of the first step requires two retrieval cycles and two storage cycles. In the first retrieval cycle, two input numbers are retrieved from the first dual-ported memory and two input numbers are retrieved from the second dual-ported memory. In the second retrieval cycle, another two input numbers are retrieved from the first dual-ported memory and another two input numbers are retrieved from the second dual-ported memory. In the first storage cycle, two intermediate values are stored in the first dual-ported memory and two intermediate values are stored in the second dual-ported memory, and in the second storage cycle, two other intermediate values are stored in the first dual-ported memory and two other intermediate values are stored in the second dual-ported memory.

The eight column-wise DFTs of the third step are 64-point DFTs. Because the storage pattern of each column of FIG. 8 either is identical to the storage pattern of FIG. 7 or is the inverse of the storage pattern of FIG. 7, each of these 64-point DFTs is effected as an n=2 FFT, composed of radix-8 FFTs, as described above with reference to FIG. 7.

It will be clear to those skilled in the art how to generalize this procedure recursively to higher values of n.

Figure 9:
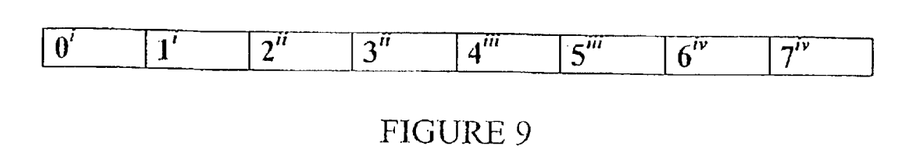
FIG. 9 illustrates the storage location pattern of the present invention in the case N=8, B=8, n=1, M=4.

FIG. 9 shows the basic storage pattern (n=1) of the primary embodiment of the present invention, for the case of B=8 and four dual-ported in-place memories. The first and second numbers of the input sequence, $x_0$ and $x_1$, are stored in the first dual-ported memory. The third and fourth numbers of the sequence, $x_2$ and $x_3$, are stored in the second dual-ported memory. The fifth and sixth numbers of the input sequence, $x_4$ and $x_5$, are stored in the third dual-ported memory. The seventh and eighth numbers of the sequence, $x_6$ and $x_7$, are stored in the fourth dual-ported memory. Correspondingly, "0" and "1" in FIG. 9 have the superscript "i", "2" and "3" in FIG. 9 have the superscript "ii", "4" and "5" in FIG. 9 have the superscript "iii", and "6" and "7" in FIG. 9 have the superscript "iv".

Figure 10:
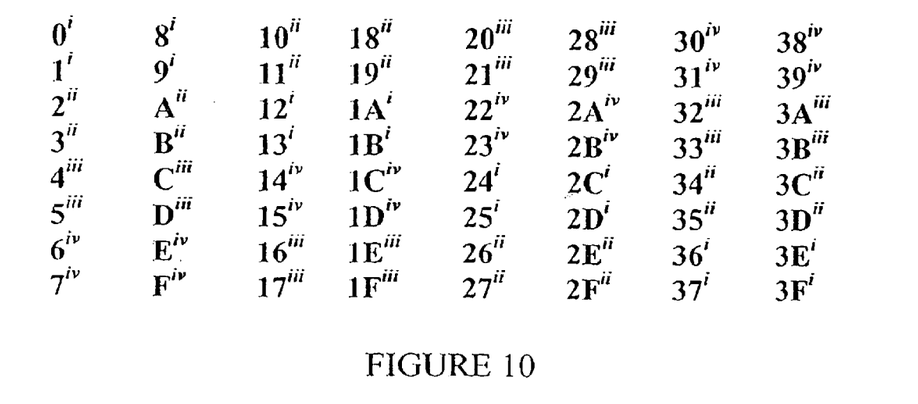
FIG. 10 illustrates the storage location pattern of the present invention in the case N=64, B=8, n=2, M=4.

FIG. 10 shows how the storage pattern of array 10 for n=2 (N=64) is constructed from the n=1 storage pattern of FIG. 9. The storage pattern of FIG. 10 is a concatenation of eight of the n=1 storage patterns of FIG. 9, taken in pairs. Each of the n=1 storage patterns of the first pair is identical to the storage pattern of FIG. 9. Each of the n=1 storage patterns of the second pair is permuted with respect to the storage pattern of FIG. 9: the first and second input numbers are stored in the second dual-ported memory, the third and fourth input numbers are stored in the first dual-ported memory, the fifth and sixth input numbers are stored in the fourth dual-ported memory and the seventh and eighth input numbers are stored in the third dual-ported memory. Each of the n=1 storage patterns of the third pair is permuted with respect to both the first pair and the second pair: the first and second input numbers are stored in the third dual-ported memory, the third and fourth input numbers are stored in the fourth dual-ported memory, the fifth and sixth input numbers are stored in the first dual-ported memory and the seventh and eighth input numbers are stored in the second dual-ported memory. Each of the n=1 storage patterns of the fourth pair is permuted with respect to the first three pairs: the first and second input numbers are stored in the fourth dual-ported memory, the third and fourth input numbers are stored in the third dual-ported memory, the fifth and sixth input numbers are stored in the second dual-ported memory and the seventh and eighth input numbers are stored in the first dual-ported memory. Note that these permutations are derangements. (A derangement is a permutation with no fixed points, i.e., a rearrangement of an ordered set of elements so that no element is in its original position.)

In each of the eight row-wise radix-8 DFTs of the first step, two input numbers are retrieved from each of the four dual-ported memories at the start of the DFT, and two intermediate values are stored in each of the four dual-ported memories at the end of the DFT. Similarly, in each of the eight column-wise radix-8 DFTs of the third step, two intermediate values are retrieved from each of the four dual-ported memories at the beginning of the DFT and two output numbers are stored in each of the eight dual-ported memories at the end of the DFT.

FIG. 11 shows how the storage pattern of array 10 for n=3 (N=512) is constructed from the n=2 storage pattern of FIG. 10. The storage pattern of FIG. 11 is a concatenation of eight of the storage patterns of FIG. 10, taken in pairs. Each of the n=2 storage patterns of the first pair is identical to the storage pattern of FIG. 10. Each of the n=2 storage patterns of the second pair is permuted with respect to the storage pattern of FIG. 10 in the same way as the storage patterns of the third and fourth columns of FIG. 10 are permuted with respect to the storage pattern of FIG. 9. Each of the n=2 storage patterns of the third pair is permuted with respect to the storage pattern of FIG. 10 in the same way as the storage patterns of the fifth and sixth columns of FIG. 10 are permuted with respect to the storage pattern of FIG. 9. Each of the n=2 storage patterns of the fourth pair is permuted with respect to the storage pattern of FIG. 10 in the same way as the storage patterns of the seventh and eighth columns of FIG. 10 are permuted with respect to the storage pattern of FIG. 9.

In each of the 64 row-wise radix-8 DFTs of the first step, two input numbers are retrieved from each of the four dual-ported memories at the start of the DFT, and two intermediate values are stored in each of the four dual-ported memories at the end of the DFT. The eight column-wise DFTs of the third step are 64-point DFTs. Because the storage pattern of each column of FIG. 11 either is identical to the storage pattern of FIG. 10 or is a permutation of the storage pattern of FIG. 10, each of these 64-point DFTs is effected as a n=2 FFT, composed of radix-8 FFTs, as described above with reference to FIG. 10.

It will be clear to those skilled in the art how to generalize this procedure recursively to higher values of n.

As noted above, the scope of the present invention includes a method of storing and Fast Fourier transforming an input sequence of $CB^n$ numbers, where B is a power of 2 and C is a power of 2 that is less than B. The row-wise DFTs of the first step are radix-C DFTs, and the column-wise DFTs of the third step are composed of radix-B DFTs.

For example, one way of performing an FFT of a sequence of 128 input numbers is to store these numbers in locations 40-BF of FIG. 5, i.e., in the second and third columns of FIG. 5. There are 64 row-wise radix-2 DFTs in the first step, performed on the rows of FIG. 5. Note that selecting the second and third columns of FIG. 5 keeps the load on the memories balanced: each radix-2 DFT gets one input value from one memory and the other input value from the other memory. There are two column-wise 64-point DFTs in the third step. Each 64-point DFT is effected as a n=3 FFT, composed of radix-4 FFTs, as described above with reference to FIG. 4. Alternatively, the input numbers are stored in locations 0-3F and 80-BF of FIG. 5, i.e., in the first and third columns of FIG. 5, or else in locations 40-7F and C0-FF of FIG. 5, i.e., in the second and fourth columns of FIG. 5.

As another example, one way of performing an FFT of a sequence of 256 input numbers is to store these numbers in locations 80-17F of FIG. 8, i.e., in the third through sixth columns of FIG. 8. There are 64 row-wise radix-4 DFTs in the first step, performed on the rows of FIG. 8. Note that selecting the third through sixth columns of FIG. 8 keeps the load on the memories balanced: each radix-4 DFT gets two input values from one memory and the other two input values from the other memory. There are four column-wise 64-point DFTs in the third step. Each 64-point DFT is effected as a n=2 FFT, composed of radix-8 FFTs, as described above with reference to FIG. 7. Using other combinations of the columns of FIG. 8, for example columns 1, 2, 7 and 8, also preserves memory load balancing.

Another way of performing an FFT of a sequence of 256 input numbers is to store these numbers in locations 0-3F, 80-BF, 100-13F and 180-1BF of FIG. 11, i.e., in the odd-numbered columns of FIG. 11. There are 64 row-wise radix-4 DFTs in the first step, performed on the rows of FIG. 8. Note that selecting the odd-numbered columns of FIG. 11 keeps the load on the memories balanced: each radix-4 DFT gets a different input value from each of the four memories. There are four column-wise 64-point DFTs in the third step. Each 64-point DFT is effected as a n=2 FFT, composed of radix-8 FFTs, as described above with reference to FIG. 10. Using other combinations of the columns of FIG. 11, for example, the even-numbered columns, also preserves memory load balancing.

The twiddle factors w are complex numbers of the form $w=\exp(2\pi jp)$. p is a rational number of the form $\lambda/N$, where X is an integer between 0 and N−1. If N is a power of 2, i.e., $N=2^I$ where I is a positive integer, $\lambda$ has a I-bit binary representation: $(p^{(I-1)}, p^{(I-2)}, \ldots, p^{(0)})$, with $p^{(I-1)}$ being the most significant bit of $\lambda$ and $p^{(0)}$ being the least significant bit of $\lambda$. Supposing, for definiteness, that I is even, it follows that $$p = \frac{1}{2^I}\sum_{i=0}^{I-1} p^{(i)}2^i = \frac{1}{2^I}\left\{\sum_{i=0}^{I/2-1} p^{(i)}2^i + 2^{I/2}\sum_{i=0}^{I/2-1} p^{(i+I/2)}2^i\right\}$$

and $$w = \exp(2\pi jp) = \exp\left[j\frac{2\pi}{2^I}\sum_{i=0}^{I/2-1} p^{(i)}2^i\right]\exp\left[j\frac{2\pi}{2^{I/2}}\sum_{i=0}^{I/2-1} p^{(i+I/2)}2^i\right] = w^{(L)}w^{(H)}$$

$w^{(L)}$, whose exponent includes the I/2 least significant bits of $\lambda$, is termed herein the least significant factor of w. $w^{(H)}$, whose exponent includes the I/2 most significant bits of $\lambda$, is termed herein the most significant factor of w. It is clear that the partition of the bits of k among the exponents of $w^{(L)}$ and $w^{(H)}$ need not be 50:50: the exponent of $w^{(L)}$ may include more than half the bits of $\lambda$ and the exponent of $w^{(H)}$ may include fewer than half the bits of $\lambda$, as long as the exponent of $w^{(L)}$ includes the least significant bits of $\lambda$, from $p^{(0)}$ through some intermediate bit, and the exponent of $w^{(H)}$ includes the rest of the bits of $\lambda$. It also will be clear to those skilled in the art how to treat the case of I being an odd number.

In FFTs whose radices N are powers of 2, many twiddle factors w share the same most significant factor $w^{(H)}$, and many twiddle factors w share the same least significant factor $w^{(L)}$, and the number of most and least significant factors $w^{(H)}$ and $w^{(L)}$ is much less than N. Therefore, according to the present invention, instead of storing all N twiddle factors w, only the most significant factors $w^{(H)}$ and only the least significant factors $w^{(L)}$ are stored, and the twiddle factors w are reconstructed from $w^{(H)}$ and $w^{(L)}$ as needed. If $I=I_H+I_L$, then instead of needing $N=2^I$ complex storage locations for the twiddle factors, only $2^{I_H}+2^{I_L}$ complex storage locations are needed. In the case of $I_H=I_L=I/2$, only $2\sqrt{N}$ complex storage locations are needed.

FIG. 12 shows the address patterns, in hexadecimal notation, of memories for storing five-bit $w^{(H)}$'s ($I_H=5$) and four-bit $w^{(L)}$'s ($I_L=4$) for reconstructing the twiddle factors w for the N=512 FFT of FIG. 8. Each entry (row, column) of FIG. 12 is a pair of addresses. The first address (two hexadecimal digits) is the address (00 through 1F), in the $w^{(H)}$ memory, wherein is stored the value of $w^{(H)}$ needed to reconstruct the twiddle factor w for multiplying the intermediate value that is stored in the corresponding location (row column) of FIG. 8. The second address (one hexadecimal digit) is the address (0 through F), in the $w^{(L)}$ memory, wherein is stored the value of $w^{(L)}$ needed to reconstruct the twiddle factor w for multiplying the intermediate value that is stored in the corresponding location (row column) of FIG. 8.

A further savings in storage is provided by the fact that not all the bits of $w^{(L)}$ need to be stored. $w^{(L)}$ is a complex number of the form $\exp(j\theta)=\cos\theta + j\sin\theta$, where $\theta$ is non-negative and close to zero. Therefore, the leading bits of the binary representation of the imaginary part of $w^{(L)}$ all are zeros, and the leading bits of the binary representation of the real part of $w^{(L)}$ all are ones. These leading bits need not be stored.

Figure 13:
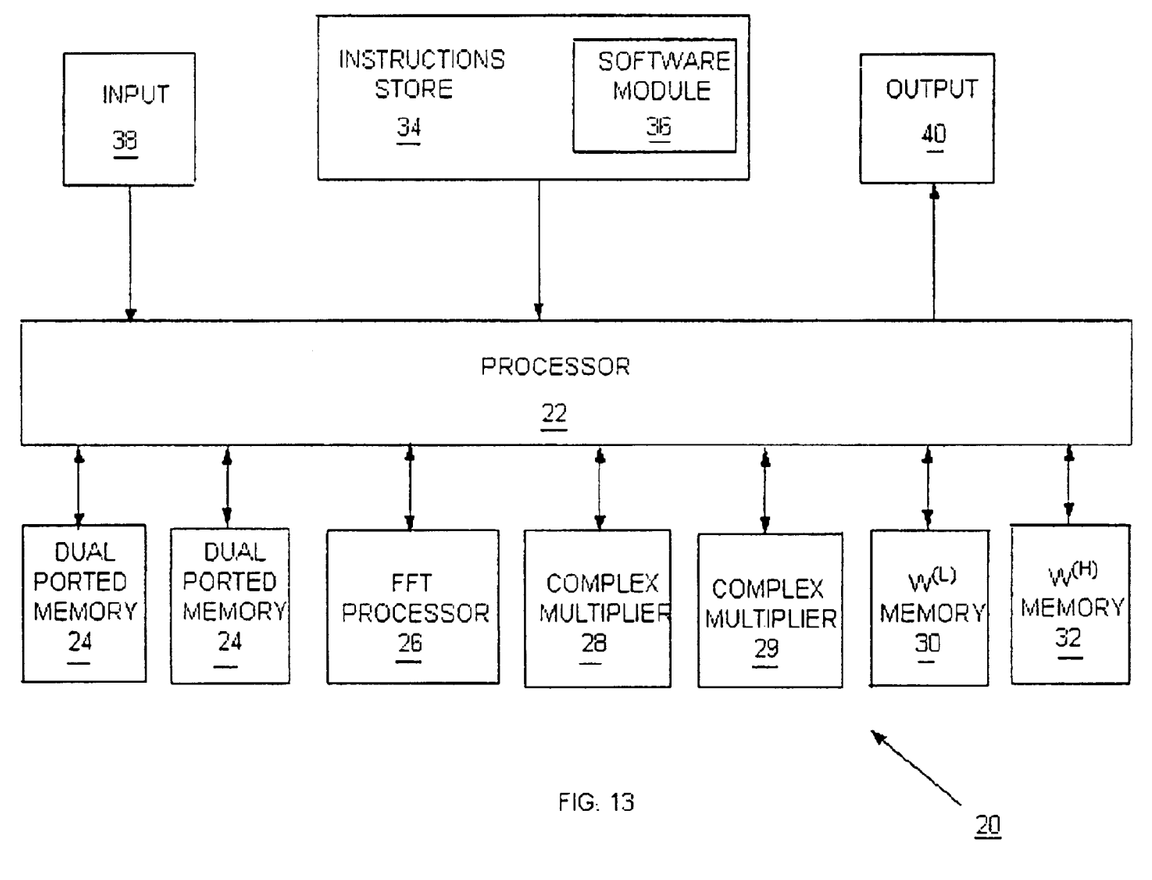
FIG. 13 is a schematic block diagram of a device of the present invention.

FIG. 13 is a partial schematic block diagram of a device 20 for effecting an in-place $N=B^n$-point FFT on N input numbers according to the principles of the present invention. Device 20 operates under the overall control of a master processor 22, and also includes M dual-ported in-place memories 24 for storing the input numbers and the intermediate values as described above, at least one dedicated FFT processor 26 for performing the radix-B FFTs of the first and third steps, a least significant factor memory 30 and a most significant factor memory 32 for storing the values of the complex least significant factors $w^{(L)}$ and the complex most significant factors $w^{(H)}$, a complex multiplier 28 for multiplying selected values of $w^{(L)}$ and $w^{(H)}$ to produce the twiddle factors w in the second step, and a complex multiplier 29 for multiplying values stored in dual-ported memories 24 by respective twiddle factors w in the second step. Note that the fact that the leading bits of the $w^{(L)}$ are known a priori allows complex multiplier 28 to be simplified, i.e., to have fewer gates than would be needed if the full binary representations of the $w^{(L)}$ were stored. The arrows in FIG. 2 indicate directions of data flow. Depending on the specific application, complex multipliers 28 and 29 may be fixed point units, floating point units, or block floating point units.

Special attention must be paid to the problem of computational load balancing. For example, with B=8 and M=2 it takes four clock cycles to perform the operations of the first and second steps on each row of FIG. 7 or 8. In each of the first two clock cycles, two complex numbers are read from each dual-ported memory 24 and forwarded to FFT processor 26. In each of the last two clock cycles, four complex numbers, output by FFT processor 26, that have already been multiplied by their respective twiddle factors (because the operations of device 20 are extensively pipelined) are written to dual port memories 24, with two of these complex products being written to each dual port memory 24. During these four clock cycles, sixteen multiplications must be performed: eight to reconstruct the twiddle factors w from the corresponding $w^{(H)}$ and $w^{(L)}$, and eight to multiply the output of FFT processor 26 by the twiddle factors. One way of accomplishing this is to use dual port ROMs as memories 30 and 32 (or alternatively to use two replicas of each memory 30 and 32) in conjunction with two complex multipliers 28 and two complex multipliers 29. Alternatively, doubling the speed of the multiplications, by using a phase locked loop to halve the clock cycle for operations such as multiplication, allows the use of only one complex multiplier 28 and only one complex multiplier 29.

The source of the N input numbers $x_0$ through $x_{N-1}$ to be transformed by device 20 is represented symbolically in FIG. 13 as an input unit 38. For example, in a real time system for determining the frequency spectrum of a natural phenomenon, input 38 may include a sensor that produces a voltage in response to the natural phenomenon and an A/D converter that samples that voltage at equally spaced sampling times. The numbers $x_0$ through $x_{N-1}$ then are digital samples produced by the A/D converter at the sampling times. The output of device 20 consists of N output numbers $x_0$ through $x_{N-1}$ that are sent to an output unit 40 for further processing. Typically, the first subsequent operation performed on the output of device 20 is resorting, to undo the digit reversal caused by device 20.

Preferably, input unit 38 is realized with two buffers. While one buffer receives new data to transform, the other buffer passes the data previously stored therein to device 20; and then the two buffers exchange roles. Alternatively, input unit 38 is realized as a FIFO that adjusts the rate of the incoming data to the rate at which device 20 effects FFTs.

Processor 22 executes instructions stored in an instruction store 34. In particular, instruction store 34 includes a software module 36 that includes instructions for storing $N=B^n$ input numbers $x_0$ through $x_{N-1}$ in dual-ported memories 24 as described above. For example, if N=256, M=2 and B=4, then the input numbers $x_0$ through $x_{N-1}$ are stored in the two dual ported memories 24 as illustrated in FIG. 5. Typically, instruction store 34 is a read-only memory and the instructions stored therein are encoded in machine language. Memories 24 are random access memories. Memories 30 and 32 are read-only memories.

In a VLSI implementation of device 20, master processor 22, instruction store 34 and software module 36 all are part of a state machine.

Device 20 also is suitable for effecting an in-place $N=CB^n$-point FFT on N input numbers according to the principles of the present invention, because FFT processor 26, in addition to performing the radix-B FFTs of the third step, also performs the radix-C<B FFTs of the first step. Software module 36 should be understood as including instructions for storing $N=CB^n$ input numbers $x_0$ through $x^{N-1}$ in dual-ported memories 24 as described above. For example, if N=128, M=2, B=4 and C=2, then the input numbers $x_0$ through $x_{N-1}$ are stored in the two dual-ported memories 24 as illustrated in the second and third columns of FIG. 5.

Although the present invention has been described in terms of storage and retrieval of the input and output numbers and of the intermediate values in dual-ported in-place memories, it is clear that the principles of the present invention may be applied to FFT devices based on single-ported memories, by using twice as many storage/retrieval cycles.

While the invention has been described with respect to a limited number of embodiments, it will be appreciated that many variations, modifications and other applications of the invention may be made.

What is claimed is:

1. A method of performing a FFT of a sequence of $N=B^n$ numbers, where B is a power of 2 and n is a positive integer, comprising the steps of:
   (a) recursively selecting a pattern of storage locations for the $B^n$ numbers in M in-place memories, M being a power of 2 that is less than B, wherein, if n=1, each said in-place memory has storage locations for a different B/M of the B numbers, and wherein, if n is greater than 1, said pattern for storing $B^n$ numbers is a concatenation of B said patterns for storing $B^{n-1}$ numbers, there being B/M successive sets of said patterns for storing $B^{n-1}$ numbers in said pattern for storing $B^n$ numbers when n is greater than 1, said patterns, for storing $B^{n-1}$ numbers, within each of said B/M successive sets, being mutually identical and being different from said patterns, for storing $B^{n-1}$ numbers, of any other said set;
   (b) storing the numbers in said storage locations;
   (c) performing an in-place radix-B DFT on each of N/B groups of values stored in said storage locations; and
   (d) if n is greater than 1, performing a length N/B DFT on each of B groups of N/B values stored in said storage locations, each said group including NI(MB) values stored in each of said in-place memories.

2. The method of claim 1, wherein each said group, whereon said in-place radix-B DFT is performed, includes B/M values stored in each of said in-place, memories.

3. The method of claim 1, wherein, if n is greater than 2, said length N/B DFTs are performed recursively, a lowest level of said recursion including, for each said length N/B DFTs, N/B2 in-place radix-B DFTs, each of said N/B$^2$ in-place radix-B DFTs being performed on B/M values from each of said in-place memories.

4. The method of claim 1, wherein M=2, said pattern for n greater than 1 then being a concatenation of B/2 said patterns, for storing B$^{n-1}$ numbers, applied to a first half of the B$^n$ numbers, with B/2 inverses of said patterns, for storing said B$^{n-1}$ numbers, applied to a second half of the B$^n$ numbers.

5. The method of claim 1, further comprising the step of:
   (e) if n is greater than 1, multiplying each of said values stored in said storage locations by a respective twiddle factor, prior to said performing of said length N/B FFTs.

6. The method of claim 5, further comprising the steps of:
   (f) factoring each said twiddle factor into a most significant factor and a least significant factor;
   (g) storing said most significant factors in a most significant factor memory; and
   (h) storing at least part of each of said least significant factors in a least significant factor memory.

7. The method of claim 6, further comprising the steps of, prior to said multiplication of said each value by said respective twiddle factor:
   (i) retrieving said most significant factor of said respective twiddle factor from said most significant factor memory;
   (j) retrieving said least significant factor of said respective twiddle factor from said least significant factor memory; and
   (k) multiplying said most significant factor of said respective twiddle factor by said least significant factor of said respective twiddle factor to produce said respective twiddle factor.

8. The method of claim 7, further comprising the step of:
   (l) for each said respective twiddle factor, if only part of said least significant factor of said each respective twiddle factor is stored in said least significant factor memory, completing said least significant factor of said each respective twiddle factor, prior to said multiplying of said most significant factor of said each respective twiddle factor by said least significant factor of said each respective twiddle factor.

9. The method of claim 1, wherein said DFTs are FFTs.

10. The method of claim 1, wherein said in-place memories are dual-ported memories.

11. The method of claim 1, wherein said in-place memories are single-ported memories.

12. A device for performing an FFT of a sequence of N=B$^n$ numbers, where B is a power of 2 and n is a positive integer, comprising:
   (a) M in-place memories, M being a power of 2 that is less than B;
   (b) a software module including a plurality of instructions for storing the N numbers in corresponding storage locations in said in-place memories according to one of a recursively derived plurality of patterns of said storage locations, said pattern for n=1 being such that a different B/M of the N numbers is stored in each said in-place memories, and said pattern for n greater than 1 being a concatenation of B of said patterns for n-1, there being B/M successive sets of said patterns for n-1 in said pattern for n greater than 1, said patterns for n-1 within each of said B/M successive sets being mutually identical and being different from said patterns for n-1 of any other said set;
   (c) a master processor for executing said instructions, thereby storing N values in N said storage locations; and
   (d) at least one FFT processor for performing a radix-B FFT on said N values taken B at a time.

13. The device of claim 12, further comprising, if n is greater than 1:
   (e) a multiplier for multiplying each of said N values by a respective twiddle factor.

14. The device of claim 13, further comprising:
   (f) at least one twiddle factor memory for storing least significant factors and most significant factors of said twiddle factors.

15. The device of claim 14, comprising two said twiddle factor memories, a first of said twiddle factor memories for storing said least significant factors and a second of said twiddle factor memories for storing said most significant factors.

16. The device of claim 12, wherein said in-place memories are dual-ported memories.

17. The device of claim 12, wherein said in-place memories are single-ported memories.

18. A method of performing a FFT of a sequence of N=CB$^n$ numbers, where B is a power of 2, C is a power of 2 that is less than B, and n is a positive integer, comprising the steps of:
   (a) recursively selecting a pattern of storage locations for B$^{n+1}$ numbers in M in-place memories, M being a power of 2 that is less than B, starting from a base storage pattern, for B numbers, wherein each said in-place memory has storage locations for a different B/M of the B numbers, each subsequently selected pattern for storing B$^m$ numbers, where m is an integer greater than 1, being a concatenation of B said patterns for storing B$^{m-1}$ numbers, there being B/M successive sets of said patterns for storing B$^{m-1}$ numbers in said pattern for storing B$^m$ numbers, said patterns, for storing B$^{m-1}$ numbers, within each of said B/M successive sets, being mutually identical and being different from said patterns, for storing B$^{m-1}$ numbers, of any other set;
   (b) storing the N numbers in N of said storage locations for B$^{n+1}$ numbers;
   (c) performing an in-place radix-C DFT on each of N/C groups of values stored in said N storage locations; and
   (d) performing a length B$^n$ DFT on each of C groups of B$^n$ values stored in said N storage locations, each said group including B$^n$/M values stored in each of said in-place memories.

19. The method of claim 18, wherein said storing of said N numbers is effected so that each of said groups of N/C values, whereon said in-place radix-C DFTs are performed, includes C/M values stored in each of said in-place memories.

20. A device for performing an FFT of a sequence of N=CB$^n$ numbers, where B is a power of 2, C is a power of 2 that is less than B, and n is a positive integer, comprising:
   (a) M in-place memories, M being a power of 2 that is less than B;
   (b) a software module including a plurality of instructions for storing the N numbers in corresponding storage locations in said in-place memories according to a recursively derived pattern of storage locations for storing $B^{n+1}$ numbers, a base pattern of said recursive derivation being a pattern for storing B numbers, such that a different B/M of the B numbers is stored in each of said in-place memories, and each subsequently derived pattern for storing $B^m$ numbers, where m is an integer greater than 1, being a concatenation of B of said patterns for storing $B^{m-1}$ numbers, there being B/M successive sets of said patterns for storing $B^{m-1}$ numbers in said pattern for storing $B^m$ numbers, said patterns for storing $B^{m-1}$ numbers, within each of said B/M successive sets, being mutually identical and being different from said patterns, for storing $B^{m-1}$ numbers, of any other set;

(c) a master processor for executing said instructions, thereby storing N values in N of said storage locations; and (d) at least one FFT processor for performing:
   (i) a radix-B FFT on said N values taken B at a time, and
   (ii) a radix-C FFT on said N values taken C at a time.

\* \* \* \* \*